(12) United States Patent
Zhai et al.

(10) Patent No.: US 10,673,356 B2
(45) Date of Patent: Jun. 2, 2020

(54) NANOFRICTION POWER GENERATION DEVICE WITH SPIRAL VIBRATING BALLS AND BUOY BODY THEREOF

(71) Applicant: HEFEI UNIVERSITY OF TECHNOLOGY, Hefei (CN)

(72) Inventors: Hua Zhai, Hefei (CN); Rui Lei, Hefei (CN); Zhanyong Hong, Hefei (CN); Yucheng Wu, Hefei (CN); Tao Jiang, Hefei (CN); Xiangyu Chen, Hefei (CN); Jianwen Yan, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 16/340,136

(22) PCT Filed: Jul. 5, 2017

(86) PCT No.: PCT/CN2017/091777
§ 371 (c)(1),
(2) Date: Apr. 8, 2019

(87) PCT Pub. No.: WO2018/223474
PCT Pub. Date: Dec. 13, 2018

(65) Prior Publication Data
US 2019/0238068 A1    Aug. 1, 2019

(30) Foreign Application Priority Data

Jun. 5, 2017 (CN) .......................... 2017 1 0411749

(51) Int. Cl.
*H02N 1/04* (2006.01)
*F03B 13/16* (2006.01)
*F03B 13/14* (2006.01)

(52) U.S. Cl.
CPC ............... *H02N 1/04* (2013.01); *F03B 13/14* (2013.01); *F03B 13/16* (2013.01);
(Continued)

(58) Field of Classification Search
CPC . H02N 1/04; F03B 13/14; F03B 13/16; Y02E 10/28; Y02E 10/30; Y02E 10/32; F03G 7/08
(Continued)

(56) References Cited

U.S. PATENT DOCUMENTS

2008/0174281 A1* 7/2008 Shau ................... H02K 7/1892
                                                                322/1
2014/0292138 A1* 10/2014 Wang ...................... H02N 1/04
                                                                310/300
(Continued)

FOREIGN PATENT DOCUMENTS

CN        103780127      *    5/2014
CN        203851063 U         9/2014
(Continued)

OTHER PUBLICATIONS

Wu et al, "Triboelectric Nanogenerator: A Foundation of the Energy for the New Era", 2019 (Year: 2019).*
(Continued)

*Primary Examiner* — Quyen P Leung
*Assistant Examiner* — Eric Johnson
(74) *Attorney, Agent, or Firm* — Bayramoglu Law Offices LLC (57) ABSTRACT

A nanofriction power generation device with spiral vibrating balls and a buoy body thereof-includes an inner spiral barrel, an outer spiral barrel sleeved outside the inner spiral barrel, hollow balls between the two spiral barrels, an electric energy storage device contained in the inner spiral barrel, and a buoy barrel for containing the outer spiral barrel. The
(Continued)

outer wall of the inner spiral barrel and the inner wall of the outer spiral barrel are respectively provided with first spiral tracks and second spiral tracks extending from one end to the opposite other end. The inner spiral barrel is in the outer spiral barrel, and the first spiral tracks and the second spiral tracks have a one-to-one correspondence and form spiral channels. Nanofriction electric generator films are attached to an outer surface of each hollow ball and an inner wall of each spiral channel.

20 Claims, 9 Drawing Sheets

(52) U.S. Cl.
CPC ..... *F05B 2220/709* (2013.01); *F05B 2250/15* (2013.01); *F05B 2250/231* (2013.01); *F05B 2250/241* (2013.01); *F05B 2260/42* (2013.01); *Y02E 10/38* (2013.01)

(58) Field of Classification Search
USPC ............... 310/310; 290/1 R, 42, 53; 322/2 A
See application file for complete search history.

(56) References Cited

U.S. PATENT DOCUMENTS

2016/0149518 A1   5/2016   Wang et al.
2019/0028040 A1*  1/2019   Song ........................ H02N 1/04

FOREIGN PATENT DOCUMENTS

| CN | 106487269 A | 3/2017 |
| CN | 107070291 A | 8/2017 |
| CN | 206775410 U | 12/2017 |

OTHER PUBLICATIONS

Lee et al, "A Spherical Hybrid Triboelectric Nanognerator for Enhanced Water Wave Energy Harvesting", Nov. 2018 (Year: 2018).*

Wang et al, "Triboelectric Nanogenerator Based on Fully Enclosed Rolling Spherical Structure for Harvesting Low Frequency Water Wave Energy", 2015 (Year: 2015).*

Yong et al, "Highly Reliable Wind Rolling Triboelectric Nanogenerator Operating in a Wide Wind Speed Range", Sep. 2016 (Year: 2016).*

Wang et al, Machine Translation of CN103780127, May 2014 (Year: 2014).*

* cited by examiner

NANOFRICTION POWER GENERATION DEVICE WITH SPIRAL VIBRATING BALLS AND BUOY BODY THEREOF

CROSS REFERENCE TO RELATED APPLICATIONS

This application is the national phase entry of International Application No. PCT/CN2017/091777, filed on Jul. 5, 2017, which is based upon and claims priority to Chinese Patent Application No. 201710411749.9, filed on Jun. 5, 2017, the entire contents of which are incorporated herein by reference.

TECHNICAL FIELD

The present invention relates to a power generation equipment, in particular to a nanofriction power generation device with spiral vibrating balls and buoy body thereof.

BACKGROUND

With the progress of human society, the demand for energy is growing. The traditional thermal power generation leads to severe pollution, thus human beings constantly exploit efficient, clean, and renewable new energy sources. The wave energy is a new energy source that meets the conditions, thereby having great development potential. At present, there are many designs of wave energy power generation devices available on the market, but problems such as having a large volume, a complicated structure, and a low conversion efficiency generally exist.

SUMMARY

In order to avoid the deficiencies existing in the above-mentioned prior art, the present invention provides a nanofriction power generation device with spiral vibrating balls. It belongs to a wave energy absorption power generation device with a simple structure, a small volume, a high efficiency and no environmental pollution, and a buoy body thereof.

The solution of the present invention is as follows: a nanofriction power generation device with spiral vibrating balls includes an inner spiral barrel, wherein an outer wall of the inner spiral barrel is provided with a plurality of first spiral tracks extending from one end of the inner spiral barrel to the opposite end; an outer spiral barrel, wherein an inner wall of the outer spiral barrel is provided with a plurality of second spiral tracks extending from one end of the outer spiral barrel to the opposite other end, the inner spiral barrel is sleeved inside the outer spiral barrel, and the plurality of first spiral tracks and the plurality of second spiral tracks have a one-to-one correspondence and are put together to form a plurality of corresponding spiral channels; a plurality of hollow balls, wherein the plurality of hollow balls are contained inside the plurality of spiral channels, and each of the spiral channels retains a storage space which can store at least one hollow ball; an electric energy storage device, wherein the electric energy storage device is contained inside the inner spiral barrel; and a buoy barrel, wherein the outer spiral barrel is contained and sealed inside the buoy barrel for suspending the nanofriction power generation device with spiral vibrating balls on a water surface. Wherein an outer surface of each hollow ball and an inner wall of each spiral channel are respectively provided with a nanofriction electric generator film, and the electric energy storage device is electrically connected to the nanofriction electric generator film on the inner wall of the spiral channel. When the nanofriction power generation device with spiral vibrating balls on the water surface is subject to a wave impact, a current is generated by a mutual friction between the nanofriction electric generator films on the hollow ball and the corresponding spiral channel, and stored in the electric energy storage device.

As a further improvement of the above-mentioned solution, one end of the buoy barrel is a closed end, the other end is an open end configured for the installation of the outer spiral barrel, and the open end seals the outer spiral barrel in the buoy barrel by a sealing cover.

Further, the nanofriction power generation device with spiral vibrating balls also includes two cover plates, and the two cover plates are installed at both ends of the outer spiral barrel, respectively.

As a further improvement of the above-mentioned solution, the hollow ball is a plastic hollow ball.

As a further improvement of the above-mentioned solution, both ends of each spiral channel are closed ends.

As a further improvement of the above-mentioned solution, the nanofriction power generation device with spiral vibrating ball also includes two cover plates, and the two cover plates are installed at both ends of the buoy barrel, respectively.

Further, the sealing cover is a sealing cover with a thread.

As a further improvement of the above-mentioned solution, a hub is arranged in the middle of the inner spiral barrel and fitted up with a rotating shaft; the outer spiral barrel is coaxial with the buoy barrel, and a gap exists at the contact portion. The rotating shaft drives the outer spiral barrel to rotate with respect to the buoy barrel; an inner wall of the buoy barrel and an outer wall of the outer spiral barrel are both provided with the nanofriction electric generator film. Current is generated through the friction generated by relative rotation, and stored in the electric energy storage device.

As a further improvement of the above-mentioned solution, the amount of spiral channels is an even number.

As a further improvement of the above-mentioned solution, the plurality of spiral channels are in a uniform and annular arrangement around the inner spiral barrel.

The present invention further provides another nanofriction power generation device with spiral vibrating balls, including:
  a buoy body configured for suspending the nanofriction power generation device with spiral vibrating balls on a water surface; a plurality of spiral channels is annularly arranged in the buoy body, centered on a center axis of the buoy body; the plurality of spiral channels extend from an end surface of one end of the buoy body to the opposite other end of the buoy body in a spiral manner;
  a plurality of hollow balls, wherein the plurality of hollow balls are contained in the plurality of spiral channels, and each of the spiral channels retain a storage space which can store at least one hollow ball;
  two cover plates installed at the two opposite ends of the buoy body; and
  an electric energy storage device, wherein the electric energy storage device is contained in a central region of the buoy body.
  Wherein, an outer surface of each hollow ball and an inner wall of each spiral channel are respectively provided with a nanofriction electric generator film; when the nanofriction power generation device with spiral vibrating balls on the water surface is subject to a wave impact, current is generated by a mutual friction between the nanofriction electric generator films on the hollow ball and the corresponding spiral channel, and stored in the electric energy storage device.

As a further improvement of the above-mentioned solution, the hollow ball is a plastic hollow ball.

As a further improvement of the above-mentioned solution, the amount of spiral channels is an even number.

As a further improvement of the above-mentioned solution, the plurality of spiral channels are in a uniform and annular arrangement around the center axis.

As a further improvement of the above-mentioned solution, the sealing cover is a sealing cover with a thread.

The present invention further provides a buoy body of a nanofriction power generation device with spiral vibrating balls. The buoy body is annularly provided with a plurality of spiral channels around a center axis centered on a center of the buoy body; the plurality of spiral channels extend from an end surface of one end of the buoy body to the opposite other end of the buoy body in a spiral manner; a plurality of hollow balls are contained in each of the spiral channels, and each of the spiral channels retain a storage space which can store at least one hollow ball; the two opposite ends of the buoy body are sealed by two cover plates.

Wherein, an outer surface of each hollow ball and an inner wall of each spiral channel are respectively provided with a nanofriction electric generator film; when the nanofriction power generation device with spiral vibrating balls on the water surface is subject to a wave impact, current is generated by a mutual friction between the nanofriction electric generator films on the hollow ball and the corresponding spiral channel, and stored in the electric energy storage device.

As a further improvement of the above-mentioned solution, the hollow ball is a plastic hollow ball.

As a further improvement of the above-mentioned solution, the amount of spiral channels is an even number.

As a further improvement of the above-mentioned solution, the plurality of spiral channels are in a uniform and annular arrangement around the center axis.

As a further improvement of the above-mentioned solution, the sealing cover is a sealing cover with a thread.

Compared with the prior art, the beneficial effects of the present invention are reflected in that: 1. The present invention has a simple structure, a good economic performance for manufacturing and no environmental pollution;

2. The present invention has a wide range of applications and can be used in rivers, lakes and oceans;

3. In the present invention, the relative motion generated by a slight disturbance is required to generate current, which has a high-power generation efficiency.

DETAILED DESCRIPTION OF THE EMBODIMENTS

In order to more clearly illustrate the objective, the technical solution and the advantage of the present invention, the present invention will be further described in detail below with reference to the drawings and embodiments. It should be understood that the embodiments described herein are merely used to interpret the present invention instead of limiting the present invention.

Embodiment 1

Figure 1:
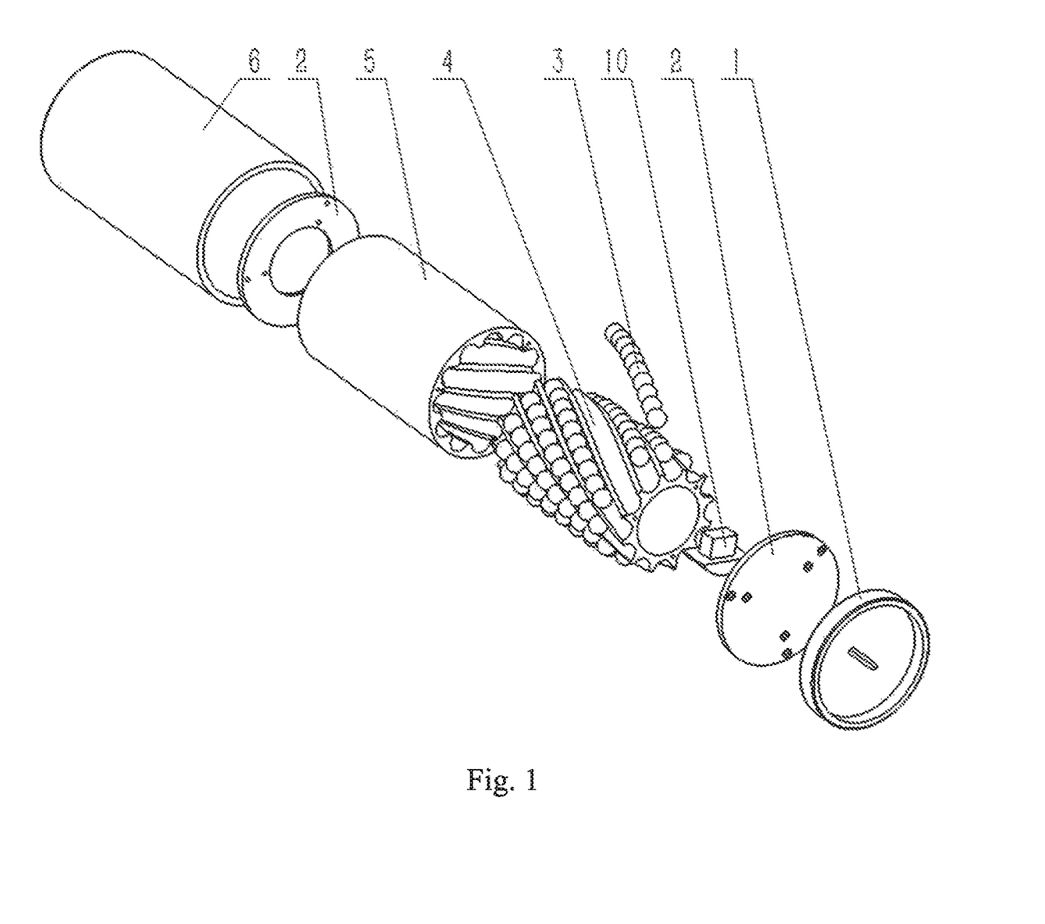
FIG. 1 is an exploded perspective diagram showing a nanofriction power generation device with spiral vibrating balls of the present invention, where one of hollow balls on spiral channels is separated to clearly show a structure of the spiral channel.
Figure 2:
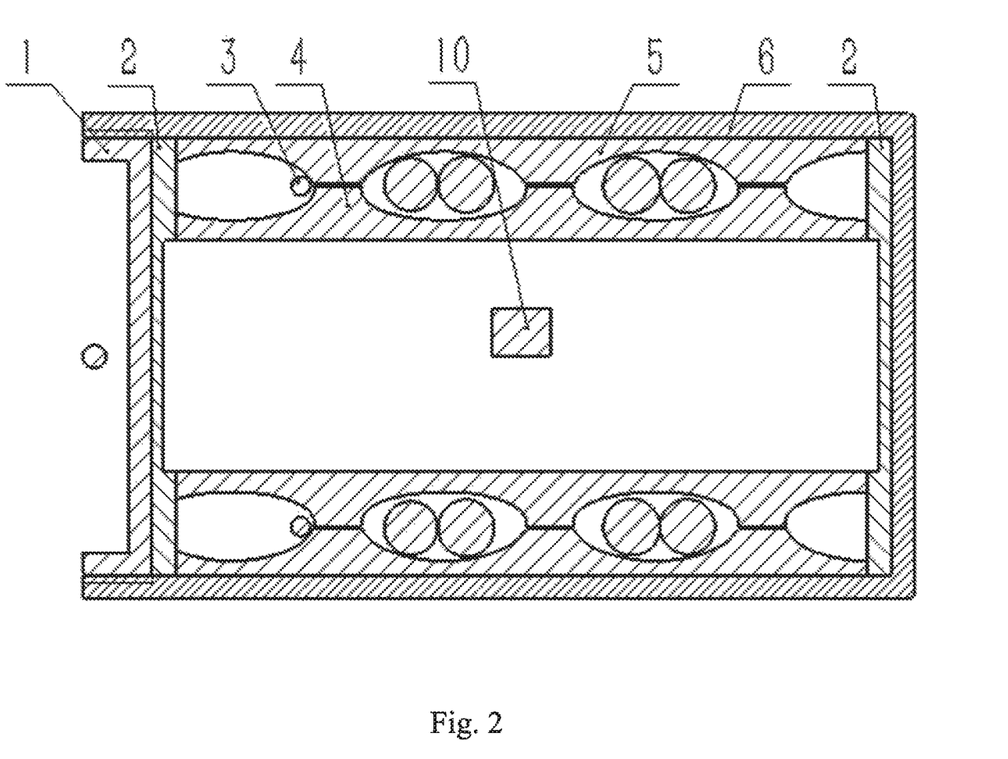
FIG. 2 is a sectional diagram showing a nanofriction power generation device with spiral vibrating balls of the present invention.

Referring to FIG. 1 and FIG. 2, the nanofriction power generation device with spiral vibrating balls of the present invention includes an inner spiral barrel 4, an outer spiral barrel 5, a plurality of hollow balls 3, an electric energy storage device 10 10, a buoy barrel 6, two cover plates 2, and a sealing cover 1.

Figure 3:
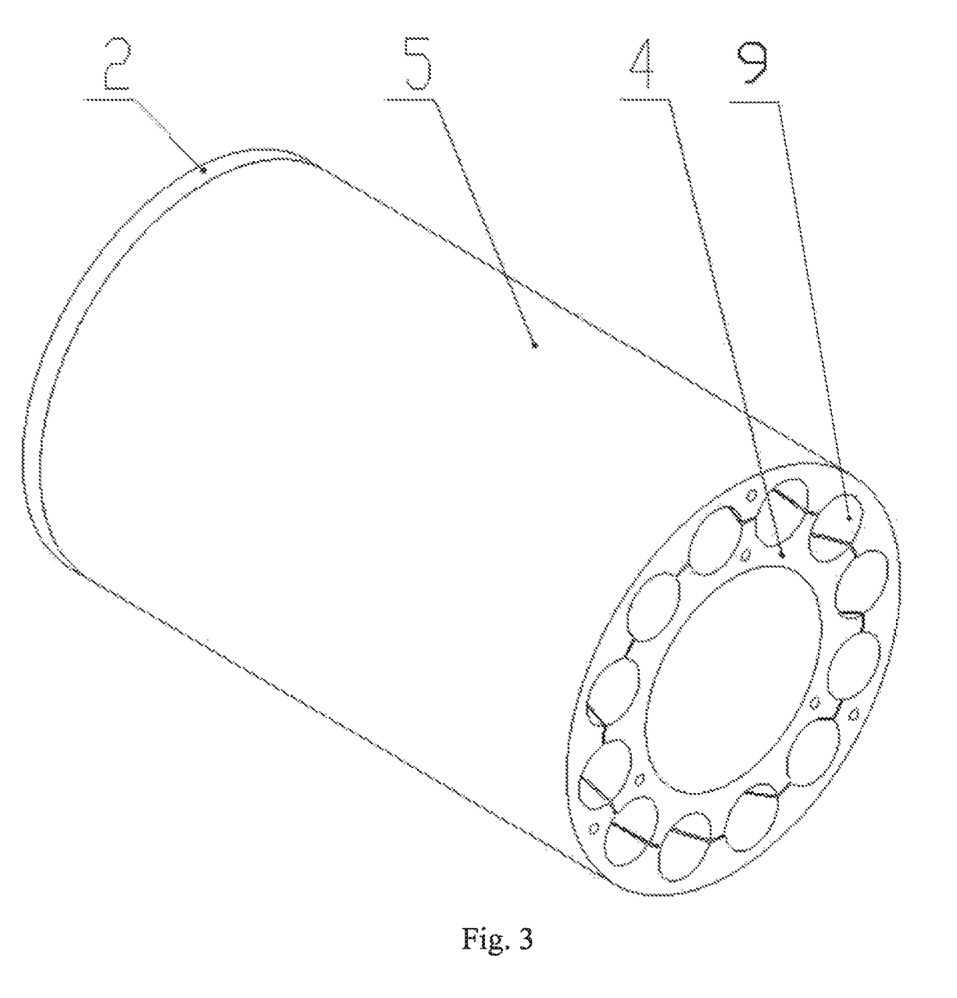
FIG. 3 is a structural schematic diagram showing a combination of an inner spiral barrel and an outer spiral barrel of a nanofriction power generation device with spiral vibrating balls of the present invention.
Figure 4:
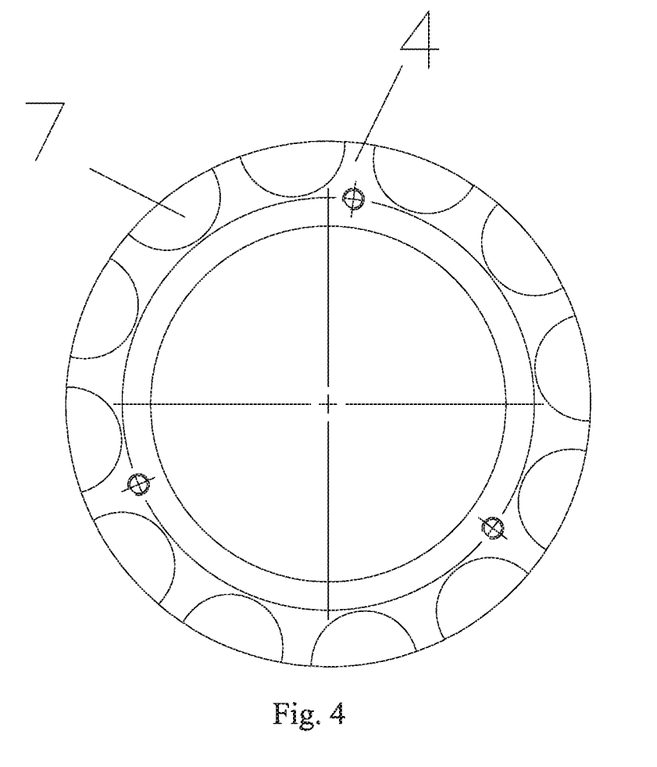
FIG. 4 is a structural schematic diagram showing an inner spiral barrel of a nanofriction power generation device with spiral vibrating balls of the present invention.

Referring to FIG. 3 and FIG. 4, an outer wall of the inner spiral barrel 4 is provided with a plurality of first spiral tracks 7 extending from one end of the inner spiral barrel 4 to the opposite other end. The middle of the inner spiral barrel 4 is hollow and can be used to place the electric energy storage device 10.

Figure 5:
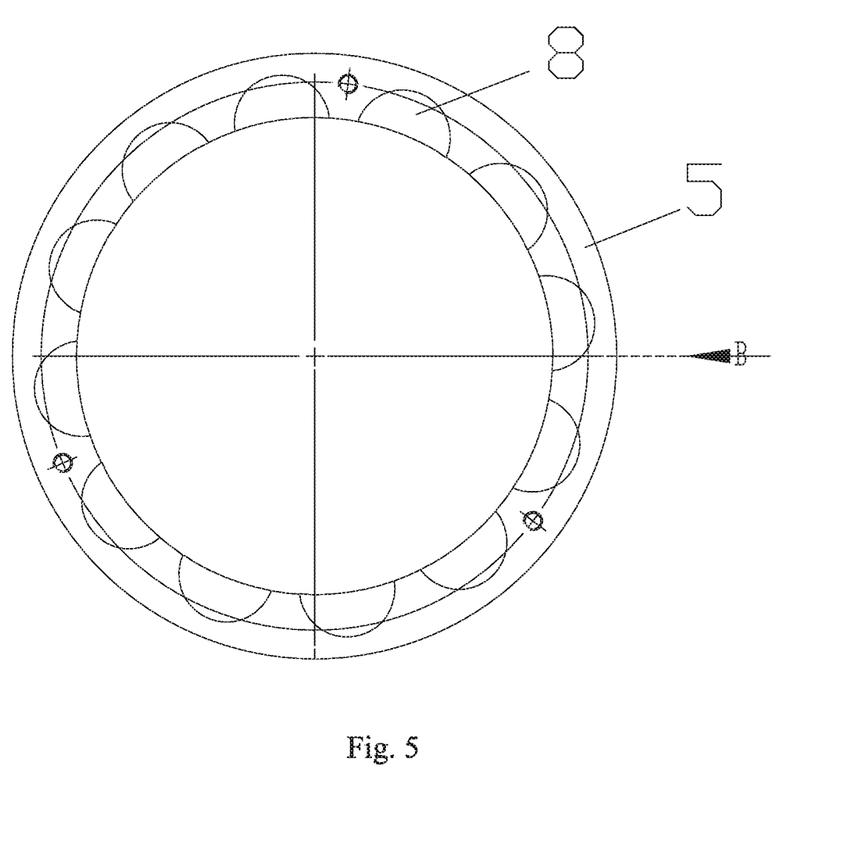
FIG. 5 is a structural schematic diagram showing an outer spiral barrel of a nanofriction power generation device with spiral vibrating balls according to the present invention.
Figure 6:
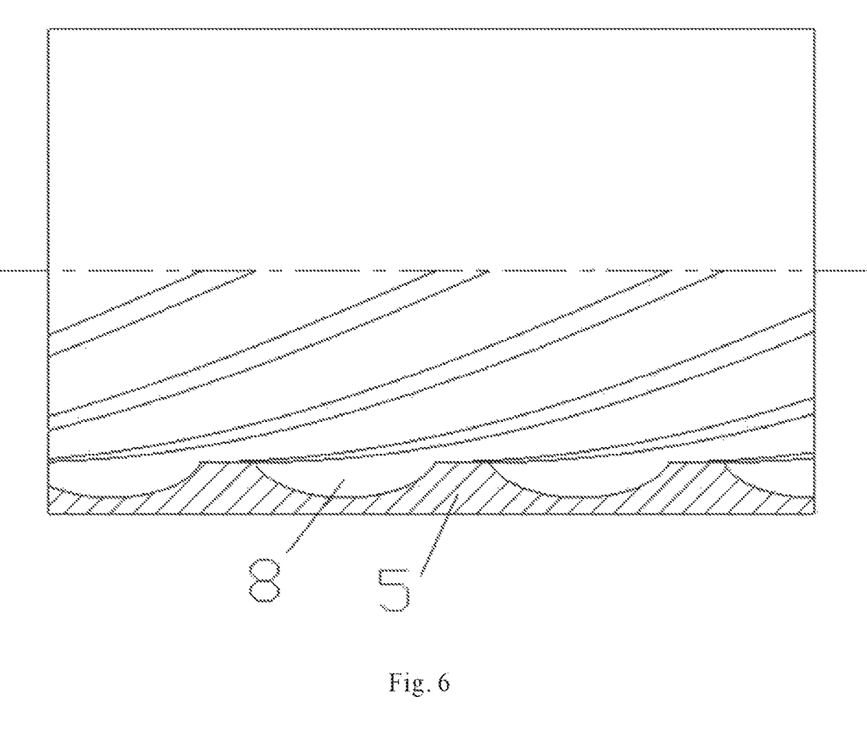
FIG. 6 is a partial sectional diagram of the outer spiral barrel of FIG. 5.

Referring to FIG. 5 and FIG. 6, an inner wall of the outer spiral barrel 5 is provided with a plurality of second spiral tracks 8 extending from one end of the outer spiral barrel 5 to the opposite end. The inner spiral barrel 4 is sleeved inside the outer spiral barrel 5. The plurality of the first spiral track 7 and the plurality of second spiral tracks have a one-to-one correspondence and are put together to form a plurality of corresponding spiral channels 9.

A plurality of hollow balls 3 are contained in a plurality of spiral channels 9, and each of the spiral channels 9 retains a storage space which can store at least one hollow ball 3. The hollow ball 3 may be a plastic hollow ball. In order to better restrict the hollow balls 3 to always move in the corresponding spiral channels 9, two ends of each spiral channel 9 can be closed ends. The amount of the spiral channels 9 may be an even number, and the even-numbered spiral channels 9 facilitate to stabilize the center of gravity of the entire device when the plastic hollow balls 3 are rolling, and to balance the device. In order to improve the balance of the entire nanofriction power generation device with spiral vibrating balls, a plurality of spiral channels 9 may be uniformly and annularly arranged around the inner spiral barrel 4.

The outer spiral barrel 5 is contained and sealed in the buoy barrel 6, which is used to suspend the nanofriction power generation device with spiral vibrating balls on a water surface. Two waterproof connection cover plates, that is, the two cover plates 2, the inner spiral barrel 4 and the outer spiral barrel 5 form a sealed cylinder. The sealed cylinder is placed in the buoy barrel 6, and then the sealing cover 1 and the buoy barrel 6 are assembled to form a sealed buoy. The inner spiral barrel 4, the outer spiral barrel 5, and the buoy barrel 6 may be coaxially arranged.

In this embodiment, the electric energy storage device 10 is first installed inside the inner spiral barrel 4, and then the inner spiral barrel 4 is installed inside the outer spiral barrel 5. After that, the two cover plates 2 are installed at both ends of the outer spiral barrel 5, so that the two ends of each spiral channel 9 are closed ends. Subsequently, the outer spiral barrel 5 is installed in the buoy barrel 6. If two ends of the buoy barrel 6 are open, the two ends of the buoy barrel 6 are sealed by the sealing covers 1, respectively. If the buoy barrel 6 is closed at one end and open at the other end, the open end of the buoy barrel 6 is sealed by the sealing cover 1. The two cover plates 2 are respectively connected with the two ends of the inner spiral barrel 4 and the outer spiral barrel 5 by screws, thereby closing both ends of the spiral channel 9, and restricting the plastic hollow ball 3 to move in the spiral channel 9.

In other embodiments, the two cover plates 2 may not be configured. For example, one end of the buoy barrel 6 may be a closed end, the other end is an open end used for the installation of the outer spiral barrel 5, and the outer spiral barrel 5 is sealed inside the buoy barrel 6 by a sealing cover 1 at the open end. The specific structure of the buoy barrel 6 is not particularly specified as long as the components mounted inside the buoy barrel 6 can float on the water surface. The sealing cover 1 may be a sealing cover with a thread. For example, an external thread is arranged on the outer wall of the sealing cover 1, and an internal thread fitted with the external thread is arranged at a position on the inner wall of the buoy barrel 6 corresponding to the sealing cover 1. Through the thread fit of the sealing cap 1 on the buoy barrel 6, a sealing of the buoy barrel 6 may be achieved.

The outer surface of each hollow ball 3 and the inner wall of each the spiral channel 9 are respectively provided with a nanofriction electric generator film, and the electric energy storage device 10 is electrically connected to the nanofriction electric generator film on the inner wall of the spiral channel 9. When the nanofriction power generation device with spiral vibrating balls on the water surface is subjected to a wave impact, a current is generated by a mutual friction between the nanofriction electric generator films on the hollow ball 3 and the corresponding spiral channel 9, and stored by the electric energy storage device 10. Consequently, in the present invention, the wave impacts the nanofriction power generation device with spiral vibrating balls to lead to the vibration of the hollow ball 3 inside along the corresponding spiral channel 9. The nanofriction electric generator films are attached to the outer surface of the hollow ball 3 and the inner wall of the spiral channel 9, respectively. The friction between the films is caused by the vibration of the hollow ball 3 along the spiral channel 9, thereby current is generated.

The whole nanofriction power generation device with spiral vibrating balls floats on the water surface. The plastic hollow ball 3 fills the spiral channel 9 formed by the inner spiral barrel 4 and the outer spiral barrel 5. Space capable of storing one or two hollow balls 3 is set aside. When the wave impacts the device, the plastic hollow ball 3 vibrates back and forth in the spiral channel 9, causing a mutual friction between the nanofriction electric generator films attached on the plastic hollow ball 3 and the spiral channel 9, thereby generating current.

Figure 7:
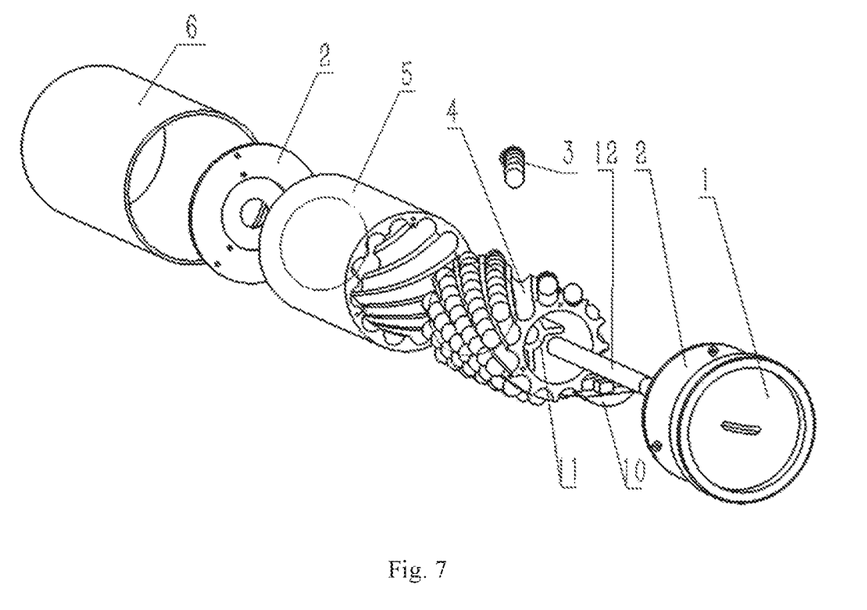
FIG. 7 is an exploded perspective diagram showing a nanofriction power generation device with spiral vibrating balls of the present invention, including the hub and rotating shaft.
Figure 8:
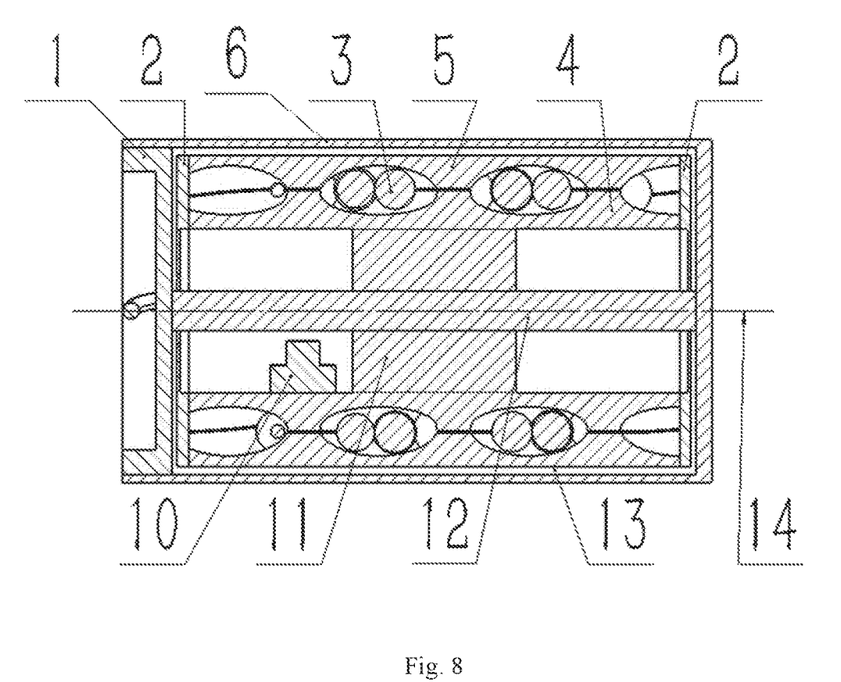
FIG. 8 is a sectional diagram showing a nanofriction power generation device with spiral vibrating balls of the present invention including the hub and rotating shaft.
Figure 9:
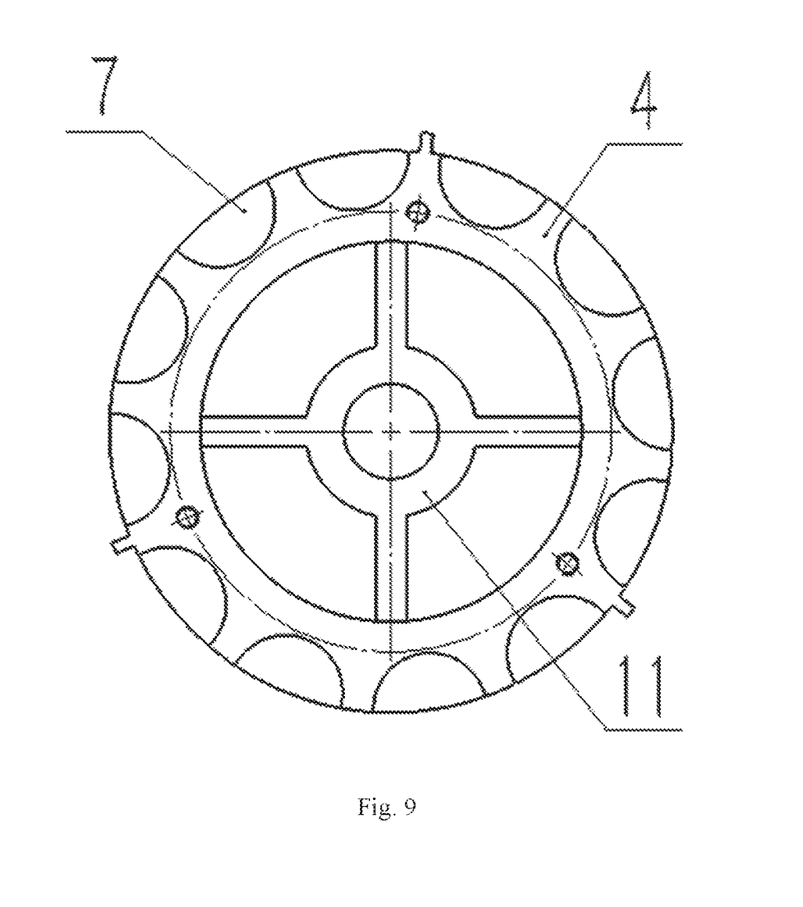
FIG. 9 is a structural schematic diagram showing an inner spiral barrel of a nanofriction power generation device with spiral vibrating balls of the present invention, including the hub.

In order to make full use of the wave energy on water surface, a hub 11 may be arranged in the middle of the inner spiral barrel 4, and fitted up with a rotating shaft 12, as shown in FIGS. 7, 8 and 9. The outer spiral barrel 5 is coaxial with the buoy barrel 6, and a gap 13 exists at the contact portion. The rotating shaft 12 drives the outer spiral barrel 5 to rotate with respect to the buoy barrel 6. The inner wall of the buoy barrel 6 and the outer wall of the outer spiral barrel 5 are respectively provided with the nanofriction electric generator film. Current is generated by friction generated by relative rotation, and stored by the electric energy storage device 10.

In an actual application, the middle of the inner spiral barrel 4 is hollow and can be modified as a hub-type, and matched with a rotating shaft 12, but the electric energy storage device 10 is still installed inside. The center of the cover plate 2 is modified to be pierced on the center, used for the rotating shaft 12 to pass through. The rotating shaft 12, the sealing cover 1 and the buoy barrel 6 are fixedly connected. The outer spiral barrel 5 is coaxial with the buoy barrel 6, and a gap 13 exists at the contact portion. Along the rotating shaft 12, the outer spiral barrel 5 can relatively rotate. The nanofriction electric generator films are respectively attached to the inner ring of the buoy barrel 6 and the outer ring of the outer spiral barrel 5. Friction is generated by the relative rotation, thereby current is generated. Namely, the current is generated by the vibration of the plastic ball, and the current is also generated by the relative rotation between the inner ring of the buoy barrel 6 and the outer ring of the outer spiral barrel 5.

In summary, the inner spiral barrel 4 and the outer spiral barrel 5 are mutually matched to form a plurality of spiral channels 9. The plurality of spiral channels 9 formed by the inner spiral barrels 4, and the outer spiral barrels 5 is filled with the plastic hollow ball 3. Space capable of storing one or two hollow balls 3 is set aside. The plastic hollow ball 3 moves in the spiral channel 9. The nanofriction electric generator films are attached on the outer surfaces of the hollow ball 3 and the spiral channel 9. Two waterproof connection cover plates 2 are respectively connected with the inner spiral barrel 4 and the outer spiral barrel 5 by screws, thereby closing both ends of the spiral channel 9, and restricting the plastic hollow ball 3 to move in the spiral channel 9. The two waterproof connection cover plates 2, the inner spiral barrel 4 and the outer spiral barrel 5 together form a closed cylinder. The closed cylinder is placed in the buoy barrel 6, and then the thread sealing cover 1 and the buoy barrel 6 form a closed buoy by thread fit. When the nanofriction power generation device with spiral vibrating balls floats on the water surface, the wave impacts the nanofriction power generation device with spiral vibrating balls, which leads to the vibration of the interior hollow ball 3 along the spiral channel 9, and the mutual friction between the nanofriction electric generator films of the outer surface of the hollow ball 3 and the spiral channel 9, thereby generating the current.

Embodiment 2

In Embodiment 2, an inner spiral barrel 4, an outer spiral barrel 5 and a buoy barrel 6 are integrated to form a buoy body, namely, the inner spiral barrel 4, the outer spiral barrel 5 and the buoy barrel 6 are an integrated structure. The buoy body is capable of suspending the nanofriction power generation device with spiral vibrating balls on the water surface.

A plurality of spiral channels 9 are annularly arranged in the buoy body around a center axis 14 centered on a center of the buoy body. The plurality of spiral channels 9 extend from an end surface of one end of the buoy body to the opposite other end of the buoy body in a spiral manner. A plurality of hollow balls 3 are still contained in the plurality of spiral channels 9, and there is a storage space capable of storing at least one hollow ball 3 in each of the spiral channels 9. The two cover plates 2 directly seal the two opposite ends of the buoy body, thereby sealing all space of the buoy body. The electric energy storage device 10 is contained in a central region of the buoy body.

An outer surface of each hollow ball 3 and an inner wall of each spiral channel 9 are respectively provided with a nanofriction electric generator film. When the nanofriction generation device with spiral vibrating balls on the water surface is subjected to a wave impact, a current is generated by the mutual friction between the nanofriction electric generator films of the hollow balls 3 and the spiral channels 9, and stored by the electric energy storage device 10. The entire original principle is the same as that of Embodiment 1, and will not be described herein.

Embodiment 3

In Embodiment 3, the buoy body is independent from the nanofriction power generation device with spiral vibrating balls, and is not packaged and sold together with the nanofriction power generation device with spiral vibrating balls. In this case, when the buoy body fails, a new buoy body may be purchased to replace the failed buoy body directly, instead of purchasing a whole nanofriction power generation device with spiral vibrating balls.

The electric energy storage device 10 of the nanofriction power generation device with spiral vibrating balls may be configured inside the buoy body or may be independent from the buoy body. When the electric energy storage device 10 is configured in the buoy body, the hole is bored in the central region of the end surface of the buoy body for installation, and then sealed by the corresponding cover plate 2.

The above descriptions are mere preferred embodiments of the present invention, and not intended to limit the present invention. Any modifications, equivalent substitutions and improvements made within the spirit and principles of the present invention should be included in the protective scope of the present invention.

What is claimed is:

1. A nanofriction power generation device with spiral vibrating balls, comprising:
    an inner spiral barrel, wherein an outer wall of the inner spiral barrel is provided with a plurality of first spiral tracks extending from one end of the inner spiral barrel to an opposite other end of the inner spiral barrel;
    an outer spiral barrel, wherein an inner wall of the outer spiral barrel is provided with a plurality of second spiral tracks extending from one end of the outer spiral barrel to an opposite other end of the outer spiral barrel, the inner spiral barrel is configured inside the outer spiral barrel, and the plurality of first spiral tracks and the plurality of second spiral tracks have a one-to-one correspondence and are put together to form a plurality of spiral channels;
    a plurality of hollow balls, wherein the plurality of hollow balls are contained inside the plurality of spiral channels, and each spiral channel respectively retains a storage space capable of storing at least one hollow ball;
    an electric energy storage device, wherein the electric energy storage device is contained inside the inner spiral barrel; and
    a buoy barrel, wherein the outer spiral barrel is contained and sealed inside the buoy barrel, and the buoy barrel is configured to suspend the nanofriction power generation device with the spiral vibrating balls on a water surface;
    wherein an outer surface of each hollow ball is provided with a first nanofriction electric generator film, and an outer surface of an inner wall of each spiral channel is provided with a second nanofriction electric generator film, and the electric energy storage device is electrically connected to the second nanofriction electric generator film on the inner wall of the spiral channel; when the nanofriction power generation device with the spiral vibrating balls on the water surface is subject to a wave impact, current is generated by mutual friction between the first nanofriction electric generator film on the hollow ball and the second nanofriction electric generator film on the spiral channel, and stored in the electric energy storage device.

2. The nanofriction power generation device with the spiral vibrating balls according to claim 1, wherein one end of the buoy barrel is a closed end, the other end of the buoy barrel is an open end configured for installation of the outer spiral barrel, and the outer spiral barrel is sealed in the buoy barrel by a sealing cover at the open end.

3. The nanofriction power generation device with the spiral vibrating balls according to claim 2, further comprising two cover plates, wherein the two cover plates are installed at both ends of the outer spiral barrel, respectively.

4. The nanofriction power generation device with the spiral vibrating balls according to claim 2, wherein the sealing cover is a sealing cover with a thread.

5. The nanofriction power generation device with the spiral vibrating balls according to claim 1, wherein the hollow ball is a plastic hollow ball.

6. The nanofriction power generation device with the spiral vibrating balls according to claim 1, wherein both ends of each spiral channel are closed ends.

7. The nanofriction power generation device with the spiral vibrating balls according to claim 1, further comprising two cover plates, wherein the two cover plates are installed at both ends of the buoy barrel, respectively.

8. The nanofriction power generation device with the spiral vibrating balls according to claim 1, wherein a hub is arranged in a middle of the inner spiral barrel, and fitted up with a rotating shaft; the outer spiral barrel is coaxial with the buoy barrel, and a gap exists between the outer spiral barrel and the buoy barrel; the rotating shaft is fixedly connected to the buoy barrel so that the outer spiral barrel rotates relative to the buoy barrel; an additional first nanofriction electric generator film and an additional second nanofriction electric generator film are respectively attached to an inner wall of the buoy barrel and an outer wall of the outer spiral barrel, current is generated through friction generated by relative rotation, and stored in the electric energy storage device.

9. The nanofriction power generation device with the spiral vibrating balls according to claim 1, wherein an amount of spiral channels is an even number.

10. The nanofriction power generation device with the spiral vibrating balls according to claim 1, wherein the plurality of spiral channels are uniformly and annularly arranged around the inner spiral barrel.

11. A nanofriction power generation device with spiral vibrating balls, comprising:
   a buoy body, wherein the buoy body suspends the nanofriction power generation device with the spiral vibrating balls on a water surface; a plurality of spiral channels is annularly arranged in the buoy body around a center axis centered on a center of the buoy body; the plurality of spiral channels extend from an end surface of one end of the buoy body to an end surface of an opposite other end of the buoy body in a spiral manner;
   a plurality of hollow balls, wherein the plurality of hollow balls are contained in the plurality of spiral channels, and each spiral channel retains a storage space capable of storing at least one hollow ball;
   two cover plates, wherein the two cover plates are installed at the two opposite ends of the buoy body; and
   an electric energy storage device, wherein the electric energy storage device is contained in a central region of the buoy body;
   wherein an outer surface of each hollow ball is provided with a first nanofriction electric generator film and an outer surface of an inner wall of each spiral channel is provided with a second nanofriction electric generator film; when the nanofriction power generation device with the spiral vibrating balls on the water surface is subject to a wave impact, current is generated by mutual friction between the first nanofriction electric generator film on the hollow ball and the second nanofriction electric generator film on the spiral channel, and stored in the electric energy storage device.

12. The nanofriction power generation device with the spiral vibrating balls according to claim 11, wherein the hollow ball is a plastic hollow ball.

13. The nanofriction power generation device with the spiral vibrating balls according to claim 11, wherein an amount of spiral channels is an even number.

14. The nanofriction power generation device with the spiral vibrating balls according to claim 11, wherein the plurality of spiral channels are uniformly and annularly arranged around the center axis.

15. The nanofriction power generation device with the spiral vibrating balls according to claim 11, wherein a sealing cover is with a thread.

16. A buoy body of a nanofriction power generation device with spiral vibrating balls, wherein a plurality of spiral channels is annularly arranged in the buoy body around a center axis centered on a center of the buoy body; the plurality of spiral channels extend from an end surface of one end of the buoy body to an end surface of an opposite other end of the buoy body in a spiral manner; a plurality of hollow balls are contained in each spiral channel, and each spiral channel retains a storage space capable of storing at least one hollow ball; the two opposite ends of the buoy body are sealed by two cover plates;
   wherein an outer surface of each hollow ball is provided with a first nanofriction electric generator film and an outer surface of an inner wall of each spiral channel is provided with a second nanofriction electric generator film; when the nanofriction power generation device with the spiral vibrating balls on a water surface is subject to a wave impact, current is generated by mutual friction between the first nanofriction electric generator film on the hollow ball and the second nanofriction electric generator film on the corresponding spiral channel, and stored in the electric energy storage device of the nanofriction power generation device with spiral vibrating balls.

17. The buoy body of the nanofriction power generation device with the spiral vibrating balls according to claim 16, wherein the hollow ball is a plastic hollow ball.

18. The buoy body of the nanofriction power generation device with the spiral vibrating balls according to claim 16, an amount of spiral channels is an even number.

19. The buoy body of the nanofriction power generation device with the spiral vibrating balls according to claim 16, wherein the plurality of spiral channels are arranged uniformly and annularly around the center axis.

20. The buoy body of the nanofriction power generation device with the spiral vibrating balls according to claim 16, wherein a sealing cover is with a thread.

\* \* \* \* \*